US012789480B2

(12) United States Patent
Kani

(10) Patent No.: US 12,789,480 B2
(45) Date of Patent: Nov. 10, 2026

(54) PROCESSING APPARATUS FOR COMPOSITE MATERIAL AND PROCESSING METHOD FOR COMPOSITE MATERIAL

(71) Applicant: MITSUBISHI HEAVY INDUSTRIES, LTD., Tokyo (JP)

(72) Inventor: Yuki Kani, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/854,384

(22) Filed: Jun. 30, 2022

(65) Prior Publication Data

US 2023/0056956 A1 Feb. 23, 2023

(30) Foreign Application Priority Data

Aug. 18, 2021 (JP) ................................ 2021-133178

(51) Int. Cl.
*B29C 70/46* (2006.01)
*B29C 43/00* (2006.01)
(Continued)

(52) U.S. Cl.
CPC .......... *B29C 70/465* (2013.01); *B29C 43/003* (2013.01); *B29C 43/52* (2013.01);
(Continued)

(58) Field of Classification Search
CPC ..... B29C 70/465; B29C 43/003; B29C 43/52; B29C 43/58; B29C 70/06; B29C 70/462;
(Continued)

(56) References Cited

U.S. PATENT DOCUMENTS 5,139,407 A 8/1992 Kim et al.
9,999,995 B2 * 6/2018 Yoshida ................. B29C 70/44
(Continued)

FOREIGN PATENT DOCUMENTS

EP 3492233 A1 6/2019
EP 3715082 A1 9/2020
(Continued)

OTHER PUBLICATIONS

JP2017222142 English translation prepared Feb. 20, 2025 (Year: 2025).*
(Continued)

*Primary Examiner* — Alison L Hindenlang
*Assistant Examiner* — Shibin Liang
(74) *Attorney, Agent, or Firm* — HAUPTMAN HAM, LLP

(57) ABSTRACT

The disclosure is to improve quality of a processed molded product. A processing apparatus is a processing apparatus for a composite material in which fibers and a thermoplastic resin are compounded. The processing apparatus includes a heating device configured to heat the composite material to a temperature higher than or equal to the melting point of the resin contained in the composite material; a mold configured to press the composite material; and a temperature adjustment unit configured to adjust the temperature of the mold. While the mold presses the composite material, the temperature adjustment unit maintains the temperature of the mold at a predetermined temperature at which a time required for solidification of the resin contained in the composite material matches a desired time.

2 Claims, 7 Drawing Sheets

(51) Int. Cl.
*B29C 43/52* (2006.01)
*B29C 43/58* (2006.01)
*B29C 70/06* (2006.01)

(52) U.S. Cl.
CPC .............. *B29C 43/58* (2013.01); *B29C 70/06* (2013.01); *B29C 70/462* (2013.01); *B29C 2043/5816* (2013.01); *B29K 2995/0046* (2013.01)

(58) Field of Classification Search
CPC .... B29C 2043/5816; B29K 2995/0046; B32B 27/12
See application file for complete search history.

(56) References Cited

U.S. PATENT DOCUMENTS

| | | | | |
|---|---|---|---|---|
| 11,014,275 | B2 * | 5/2021 | Mitsunaga | .............. B29C 43/52 |
| 2009/0117366 | A1 | 5/2009 | Honma | |
| 2015/0375444 | A1 | 12/2015 | Bamford et al. | |
| 2019/0160715 | A1 | 5/2019 | Mitsunaga et al. | |
| 2020/0307126 | A1 | 10/2020 | Blom-Schieber et al. | |

FOREIGN PATENT DOCUMENTS

| | | | | |
|---|---|---|---|---|
| JP | 2004518165 | A | 6/2004 | |
| JP | 2009113369 | A | 5/2009 | |
| JP | 2010167588 | A | 8/2010 | |
| JP | 2013154625 | A | 8/2013 | |
| JP | 2017518904 | A | 7/2017 | |
| JP | 2017222142 | * | 12/2017 | ............. B29C 43/52 |
| JP | 2020152091 | A | 9/2020 | |
| JP | 2020183111 | A | 11/2020 | |
| WO | 02057070 | A2 | 7/2002 | |
| WO | 2006028107 | A1 | 3/2006 | |
| WO | 2018021488 | A1 | 2/2018 | |

OTHER PUBLICATIONS

Extended European Search Report for European Application No. 22180691.2 mailed Jan. 3, 2023; 7pp.

Office Action for Japanese application No. 2021-133178 mailed May 9, 2023; 12pp.

Office Action for Japanese application No. 2021-133178 mailed Nov. 1, 2022; 8pp.

* cited by examiner

FIG. 7

| MOLD SETTING TEMPERATURE | INTERNAL QUALITY | SURFACE CONDITION | EVALUATION |
|---|---|---|---|
| 220°C | VOID PRESENT | IMPREGNATION INSUFFICIENT | NO GOOD |
| 240°C | VOID PRESENT | IMPREGNATION INSUFFICIENT | NO GOOD |
| 260°C | VOID PRESENT | IMPREGNATION INSUFFICIENT | NO GOOD |
| 265°C | MOSTLY NO DEFECT | MOSTLY NON-DEFECTIVE | ACCEPTABLE |
| 270°C | NO DEFECT | NON-DEFECTIVE | GOOD |
| 275°C | NO DEFECT | NON-DEFECTIVE | GOOD |
| 280°C | NO DEFECT | NON-DEFECTIVE | GOOD |
| 285°C | NO DEFECT | MOSTLY NON-DEFECTIVE | ACCEPTABLE |
| 290°C | NO DEFECT | SOLIDIFICATION INSUFFICIENT | NO GOOD |

PROCESSING APPARATUS FOR COMPOSITE MATERIAL AND PROCESSING METHOD FOR COMPOSITE MATERIAL

CROSS-REFERENCE TO RELATED APPLICATIONS

This application claims the benefit of priority to Japanese Patent Application Number 2021-133178 filed on Aug. 18, 2021. The entire contents of the above-identified application are hereby incorporated by reference.

BACKGROUND

1. Technical Field

The present disclosure relates to a processing apparatus for a composite material and a processing method for a composite material.

2. Description of Related Art

For aircraft components such as a fuselage and a main wing of an aircraft, a composite material such as thermoplastic carbon fiber reinforced plastic (CFRP), for example, may be used. As a method for processing such a thermoplastic composite material into a desired shape, there is a method of pressurizing a composite material by a mold or the like to deform the composite material and, while maintaining the pressurized state, then gradually decrease a temperature of the mold or the like to solidify the composite material (for example, Japanese Patent Application Laid-Open No. 2013-154625).

Japanese Patent Application Laid-Open No. 2013-154625 discloses a processing method including a molding step of compressing and molding a thermoplastic resin-based fiber reinforced composite material and a cooling step of cooling and solidifying the thermoplastic resin-based fiber reinforced composite material after the molding step. In the molding step, current is conducted in an induction heating coil to heat a heating plate by high frequency induction heating, a face board is evenly heated by heat transfer from the heating plate, the thermoplastic resin-based fiber reinforced composite material is heated by heat transfer from the face board and further pressurized, and thereby compression molding is performed. Further, in the cooling step, high frequency induction heating of the heating plate is stopped, a cooling medium is passed through a cooling circuit inside the face board to cool a molding surface of the face board, and the thermoplastic resin-based fiber reinforced composite material is cooled and solidified by heat transfer.

Japanese Patent Application Laid-Open No. 2013-154625 is an example of the related art.

BRIEF SUMMARY

However, in the method disclosed in Japanese Patent Application Laid-Open No. 2013-154625, variation may occur in the temperature of the mold during the temperature fall process due to the arrangement of the cooling circuit, disturbance caused by an external air, or the like. Variation in the temperature of the mold during a temperature fall process may cause variation in the temperature of the composite material to which the temperature of the mold is transferred. Accordingly, solidification progress of a base resin of the composite material becomes uneven depending on locations, and a part where the composite material has been solidified and a part where the composite material has not yet been solidified (hereafter, referred to as "unsolidified part") may occur in the composite material. If a solidified part occurs in a composite material, the solidified part will support the mold and prevent application of a pressure to the unsolidified part. This may cause a lack of pressurization or a contact failure between the composite material and the mold in the unsolidified part. Thus, if a lack of pressurization or a contact failure between a composite material and a mold occurs, a void or the like may occur in a processed molded product, which may deteriorate the internal quality, or fibers may be exposed on the surface of the processed molded product, which may deteriorate the surface quality.

Further, as a method of processing a composite material into a desired shape, one of the conceivable methods is to quickly convey a thermoplastic composite material, which has been heated to or above the melting point in advance by a heater, an oven, or the like, to a mold adjusted at a temperature at which solidification is facilitated, press and deform the thermoplastic composite material by using the mold, and solidify the thermoplastic composite material in the mold without taking it out. In this method, since the temperature of the mold is set to a temperature at which solidification of the resin proceeds rapidly and reliably (for example, a temperature at which crystallization (solidification) of the base resin of the composite material proceeds most rapidly), the press time is set to be short. Specifically, the press time is set to several seconds to several tens of seconds, for example.

In this method, however, when the composite material is pressed, solidification of the base resin of the composite material proceeds rapidly from a time when the mold is being closed to a time immediately after the mold has been closed. Thus, the composite material may be solidified without being sufficiently pressurized, and the resin may be insufficiently impregnated into the fiber. Thus, a void or the like may occur in a processed molded product, which may deteriorate the internal quality, or fibers may be exposed on the surface of the processed molded product, which may deteriorate the surface quality. In particular, since such problems are notable in a large component or a complex shaped component that requires much time for the resin to be entirely impregnated, the above method is not applicable to a large component or a complex shaped component.

The present disclosure has been made in view of such circumstances and intends to provide a processing apparatus for a composite material and a processing method for a composite material that can improve the quality of a processed molded product.

To solve the problems described above, a processing apparatus for a composite material and a processing method for a composite material of the present disclosure employ the following solutions.

A processing apparatus for a composite material according to one aspect of the present disclosure is a processing apparatus for a composite material in which fibers and a thermoplastic resin are compounded and includes: a heating device configured to heat the composite material to a temperature higher than or equal to a melting point of the resin contained in the composite material; a mold configured to press the composite material; and a temperature adjustment unit configured to adjust a temperature of the mold, and while the mold presses the composite material, the temperature adjustment unit maintains the temperature of the mold at a predetermined temperature at which a time required for solidification of the resin contained in the composite material matches a desired time.

A processing method for a composite material according to one aspect of the present disclosure is a processing method for a composite material in which fibers and a thermoplastic resin are compounded and includes: heating the composite material to a temperature higher than or equal to a melting point of the resin contained in the composite material; and pressing, by using a mold, the composite material heated by the heating, and while the mold presses the composite material, the pressing maintains a temperature of the mold at a predetermined temperature at which a time required for solidification of the resin contained in the composite material matches a desired time by using a temperature adjustment unit configured to adjust the temperature of the mold.

According to the present disclosure, it is possible to improve the quality of a processed molded product.

BRIEF DESCRIPTION OF THE SEVERAL VIEWS OF THE DRAWINGS

FIG. 7 is a table illustrating a relationship between mold setting temperatures and evaluation values in the processing method according to the embodiment of the present disclosure.

DETAILED DESCRIPTION

One embodiment of a processing apparatus for a composite material and a processing method for a composite material according to the present disclosure will be described below with reference to the drawings.

A processing apparatus 10 according to the present embodiment is an apparatus that molds a planar plate-like composite material 1 into a desired shape in order to manufacture a stringer, a spar, a frame, a rib, or the like that are aircraft components forming an aircraft structure, and the composite material 1 is the material thereof. An example of the composite material 1 may be, for example, carbon fiber reinforced plastic (CFRP) in which a thermoplastic resin and a carbon fiber are compounded. Specifically, the composite material 1 may be a laminated body in which multiple layers of fiber reinforced sheets having fibers impregnated with a resin (hereafter, also referred to as "base resin") are laminated. An example of the resin contained in the composite material 1 may be Poly Ether Ether Ketone (PEEK). Note that the material of the composite material 1 may be any composite material in which fibers and a thermoplastic resin are compounded and is not limited to the composite material 1 described above.

Figure 4:
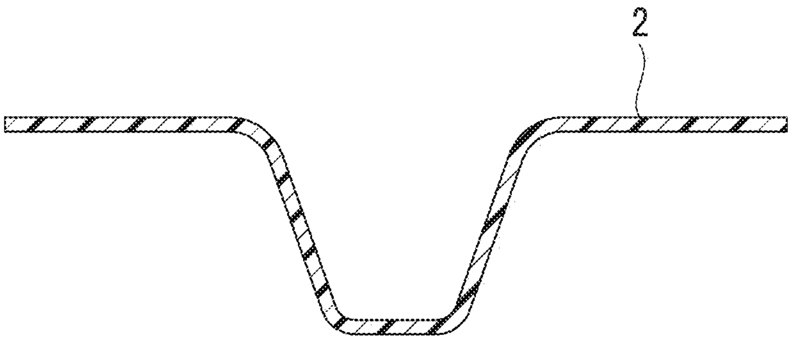
FIG. 4 is a schematic front view illustrating a molded product according to the embodiment of the present disclosure.

The processing apparatus 10 according to the present embodiment is an apparatus that processes the planar plate-like composite material 1 to manufacture a molded product 2 (see FIG. 4). The molded product 2 according to the present embodiment is a long member, and the cross-sectional shape thereof taken along a plane orthogonal to the longitudinal direction is a hat shape. Further, the molded product 2 has a plate thickness of about 2 mm to 3 mm. Note that the shape and the plate thickness of the molded product 2 each are an example and not limited thereto.

Figure 1:
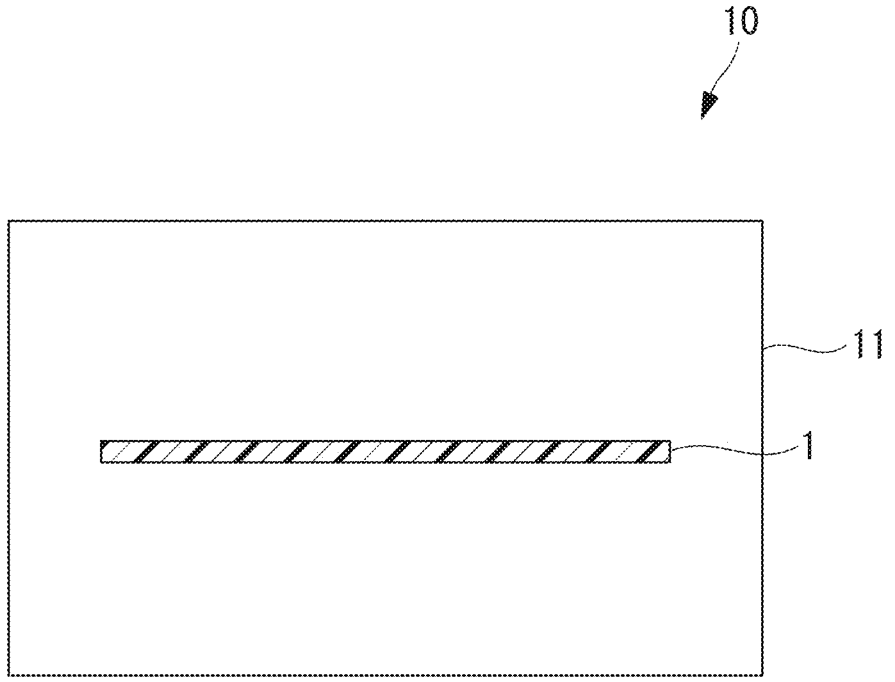
FIG. 1 is a schematic diagram illustrating a heating device according to an embodiment of the present disclosure.
Figure 2:
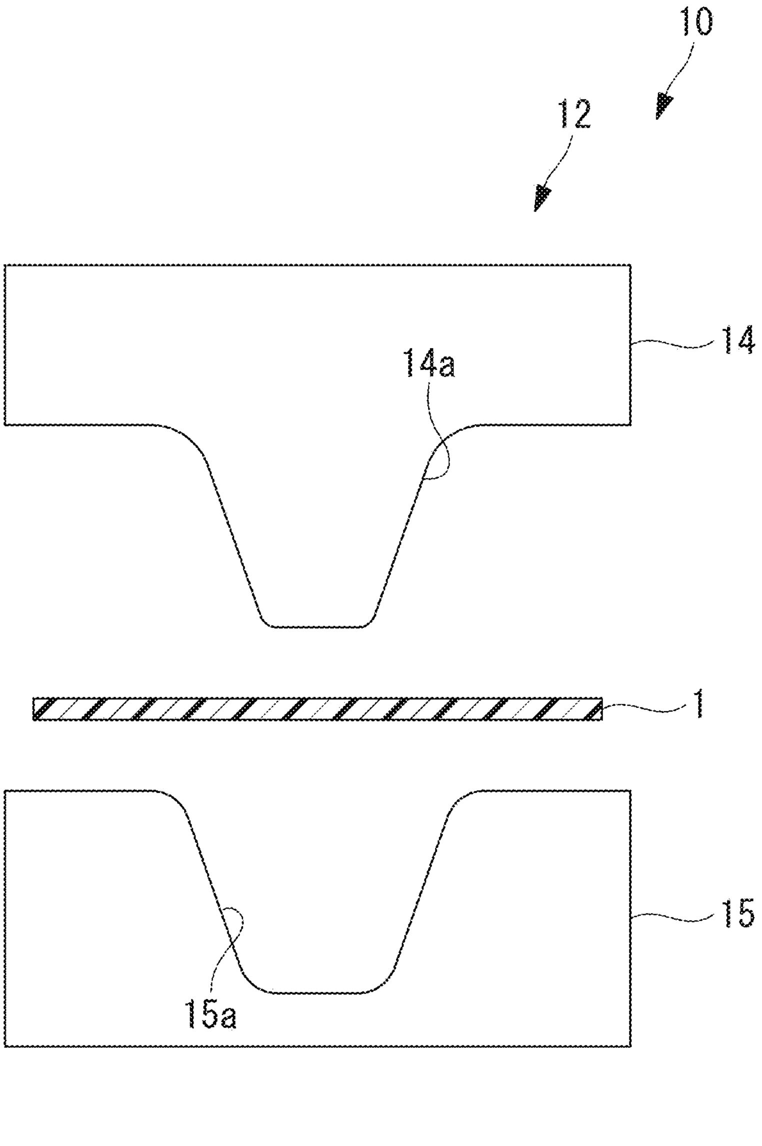
FIG. 2 is a schematic front view illustrating a composite material and a mold according to the embodiment of the present disclosure and illustrates a state before the composite material is pressed by the mold.

As illustrated in FIG. 1 and FIG. 2, the processing apparatus 10 according to the present embodiment includes a heating device 11 (see FIG. 1) configured to heat the composite material 1, a mold 12 (see FIG. 2) configured to press the composite material 1, a pressing device 13 configured to press the mold 12, and a temperature adjustment unit (not illustrated) built in the mold 12 and configured to adjust the temperature of the mold 12.

The heating device 11 heats the composite material 1 contained inside. The heating device 11 heats the composite material 1 to a temperature higher than or equal to the melting point of a resin contained in the composite material 1. For example, the heating device 11 may be an oven or may be a far-infrared heating furnace.

Figure 3:
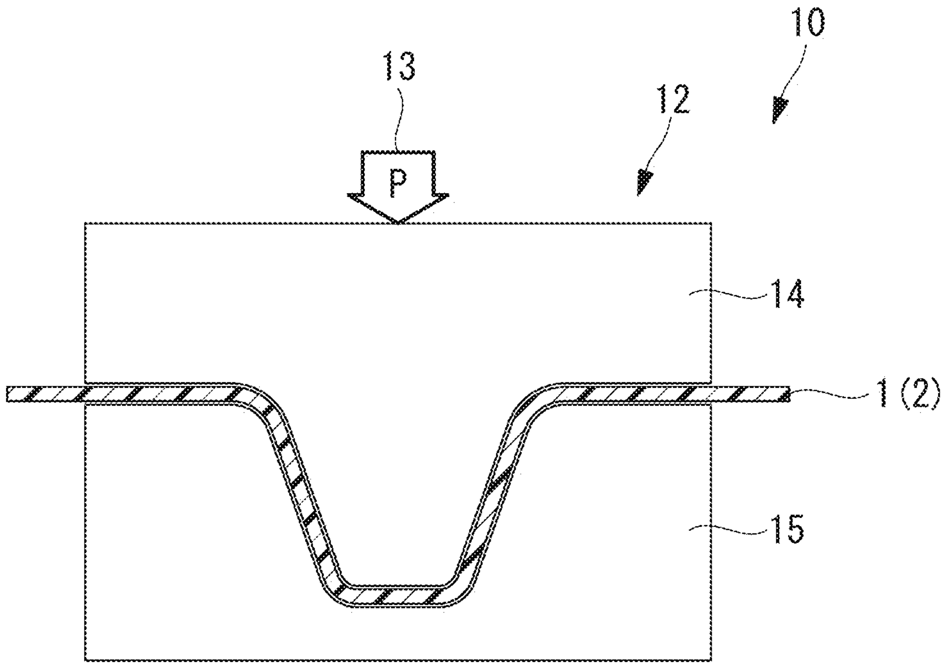
FIG. 3 is a schematic front view illustrating the composite material and the mold according to the embodiment of the present disclosure and illustrates a state after the composite material has been pressed by the mold.

As illustrated in FIG. 2 and FIG. 3, the mold 12 has a first mold 14 arranged on one side in the pressing direction of the composite material 1 and a second mold 15 arranged on the other side in the pressing direction of the composite material 1. The first mold 14 and the second mold 15 are arranged so as to interpose the composite material 1. In the first mold 14, substantially the center region of a pressing surface 14*a* that presses the composite material 1 protrudes downward. In the second mold 15, substantially the center region of a pressing surface 15*a* that presses the composite material 1 is recessed downward.

As illustrated in FIG. 3, the pressing device 13 moves the first mold 14 in the direction of the second mold 15; that is, the pressing device 13 moves the first mold 14 so that the first mold 14 presses the composite material 1. The composite material 1 is deformed between the first mold 14 and the second mold 15 by the drive force of the pressing device 13. Note that the pressing device 13 may move both the first mold 14 and the second mold 15 so that the first mold 14 and the second mold 15 come closer to each other.

The temperature adjustment unit is arranged inside or outside the mold 12 and can adjust the temperature of the mold 12. For example, the temperature adjustment unit has a heater that is built in the mold 12 and heats the mold 12 and a cooling pipe that is built in the mold 12 and through which cooling water to cool the mold 12 flows. The temperature adjustment unit can heat the mold 12 to a predetermined temperature by activating the heater. Further, the mold heating device can maintain the temperature of the mold 12 at a predetermined temperature by using the heater and the cooling pipe.

Further, the temperature adjustment unit may include a temperature detection unit (not illustrated) that detects the temperature of the mold 12. Further, the temperature adjustment unit may include a control unit (not illustrated) that controls the mold heating device based on the temperature of the mold 12 detected by the temperature detection unit. The control device controls the mold heating device to heat the mold 12 to a predetermined temperature and maintain the temperature of the mold 12 at the predetermined temperature.

The control device is formed of a central processing unit (CPU), a random access memory (RAM), a read only memory (ROM), a computer readable storage medium, and the like, for example. Further, a series of processes for implementing various functions are stored in the storage medium or the like in a form of a program as an example, and various functions are implemented when the CPU reads such a program to the RAM or the like and performs modification or operational processing on information. Note that a form in which a program is installed in advance in a ROM or another storage medium, a form in which a program is provided in a state of being stored in a computer readable storage medium, a form in which a program is delivered via a wired or wireless communication scheme, or the like may be applied to the program. The computer readable storage medium may be a magnetic disk, a magneto-optical disk, a CD-ROM, a DVD-ROM, a semiconductor memory, or the like.

Next, a method of processing the composite material 1 to manufacture the molded product 2 by using the processing apparatus 10 and the like described above will be described.

Composite Material Manufacturing Step

First, a method of manufacturing the planar plate-like composite material 1 will be described.

First, a plurality of composite material base materials (for example, fiber reinforced sheets) are laminated to manufacture a planar plate-like laminated body. Next, the laminated body is set in a press machine (not illustrated). This press machine has a heating mechanism (an electric heater or the like) that heats a laminated body and a cooling function (a water-cooled pipe or the like) that cools the laminated body. Next, the press machine is activated to pressurize and heat the laminated body. At this time, the laminated body is heated until the temperature of the laminated body increases to or above the melting point of the resin contained in the laminated body. This causes the resin to be melted and impregnated into the fibers. Further, gaps between base materials forming the laminated body are collapsed by pressurization, and thereby the laminated body is deaired. Next, the cooling mechanism is activated to cool the laminated body while pressurizing the laminated body. At this time, the laminated body is cooled until the temperature of the laminated body decreases below the glass-transition temperature of the resin contained in the laminated body. Accordingly, the resin is solidified. Next, the press machine is stopped, and the laminated body (composite material 1) is taken out. In such a way, the planar plate-like composite material 1 is manufactured.

Note that the method of manufacturing the planar plate-like composite material 1 is not limited to the method described above. For example, autoclave molding may be used for manufacturing.

Next, a method of processing the planar plate-like composite material 1 to manufacture the molded product 2 by using the processing apparatus 10 will be described.

Heating Step

First, as illustrated in FIG. 1, the composite material 1 is heated (preheated) by the heating device 11. At this time, the composite material 1 is heated until the melting point of the resin contained in the composite material 1 is reached. The composite material 1 is heated by the heating device 11, and thereby the resin solidified during the manufacture of the laminated body is re-melted into a state where the resin is not sufficiently impregnated into the fibers.

Setting Step

Next, the composite material 1 is taken out of the heating device 11 and conveyed to the mold 12. Next, as illustrated in FIG. 2, the composite material 1 conveyed to the mold 12 is set in the mold 12. It is desirable to complete the conveyance and setting of the composite material 1 within several seconds.

The mold 12 has been heated to a predetermined temperature by the temperature adjustment unit before the composite material 1 is set. The predetermined temperature is set so that the time required for solidification of the resin contained in the composite material 1 is adjusted to a desired time. For example, the predetermined temperature is higher than or equal to a temperature lower by 40° C. than the melting point of the resin contained in the composite material 1 and is lower than or equal to a temperature lower by 20° C. than the melting point. Specifically, for example, when the resin is a PEEK-based resin and the melting point of the resin is 305° C., the predetermined temperature is higher than or equal to 265° C. and lower than or equal to 285° C. Further, the predetermined temperature may be determined based on the viscoelasticity of the resin contained in the composite material 1. Further, for example, the predetermined temperature may be a temperature lower than the melting point of the resin and higher than a temperature at which the resin is rapidly solidified (temperature T5 in FIG. 5).

Pressing Step

After the composite material 1 is set in the mold 12 preheated by the temperature adjustment unit, the first mold 14 is moved in the direction of the second mold 15 by the pressing device 13 to press the composite material 1, as illustrated in FIG. 3. In such a way, the composite material 1 is molded into a shape corresponding to the mold 12. During this period, the composite material 1 is cooled to substantially the same temperature as the temperature of the mold 12 by heat transfer from the composite material 1 to the mold 12.

Next, a state where the composite material 1 is pressurized is maintained for a predetermined time. During this period, the temperature of the mold 12 is maintained at the predetermined temperature described above by the temperature adjustment unit. Further, the time for pressurizing the composite material 1 is set to a time in accordance with the characteristics of the resin and the temperature of the mold 12. After the composite material 1 is maintained at a predetermined temperature for the predetermined time, the base resin of the composite material 1 is solidified to have hardness sufficient for taking out in the taking-out step described later. The time for pressing the composite material 1 may be a time required for the resin to be sufficiently re-impregnated into fibers not sufficiently impregnated with the resin because of the heating step. Specifically, the time for pressurizing the composite material 1 may be set to about 15 minutes to 30 minutes, for example.

Further, the pressing force that the pressing device 13 presses the mold 12 is greater than or equal to 0.3 MPa and less than or equal to 10.0 MPa. More preferably, the pressing force is greater than or equal to 0.3 MPa and less than or equal to 5.0 MPa. The pressing force may be, for example, 4.0 MPa.

In such a way, by pressurizing the composite material 1 for a predetermined time by the mold 12 at a predetermined temperature, it is possible to sufficiently re-impregnate the resin into the fibers not sufficiently impregnated with the resin because of the heating step and solidify the resin contained in the composite material 1 to obtain a densely solidified composite material 1.

Taking-out Step

After the pressurization of the composite material 1 ends, the first mold 14 is moved in the direction away from the second mold 15, and the composite material 1 (molded product 2) is taken out of the mold 12. In such a way, the molded product 2 having a desired shape is manufactured, as illustrated in FIG. 4.

Figure 5:
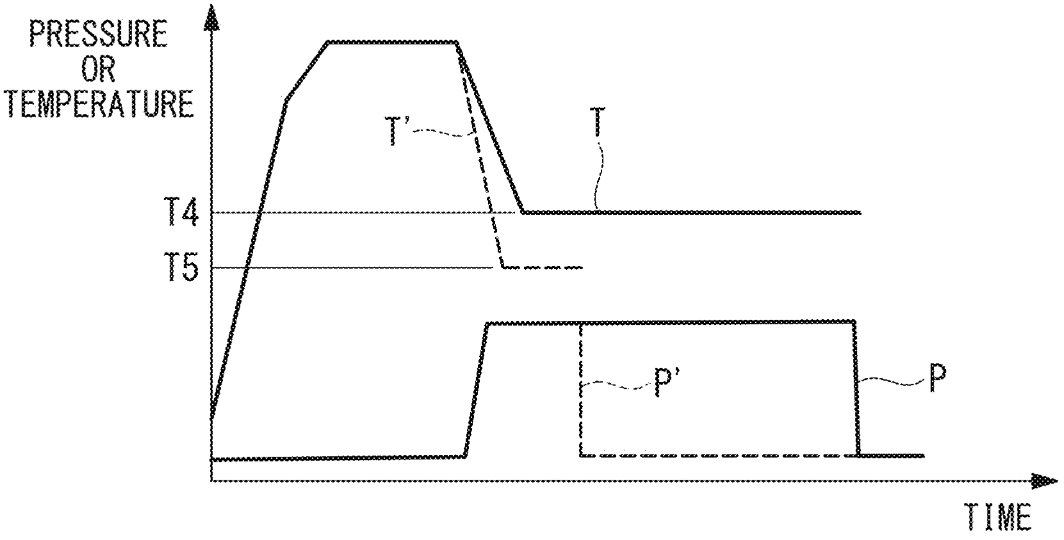
FIG. 5 is a graph illustrating the pressure worked to the composite material and the temperature of the composite material with time in a processing method for a composite material according to the embodiment of the present disclosure.

Changes in the temperature of the composite material 1 and the pressure working on the composite material 1 in each step will be described with reference to the graph of FIG. 5. In FIG. 5, the horizontal axis represents time, and the vertical axis represents the pressure or the temperature. Further, the solid line T represents the temperature per time of the composite material 1. Further, the solid line P represents the pressure per time working on the composite material 1.

As indicated by the solid line T, first, the composite material 1 is heated, and the temperature rises (heating step). Next, the composite material 1 is maintained at a constant temperature for a predetermined time inside the heating device 11. Next, the composite material 1 is conveyed from the heating device 11 to the mold 12 and set in the mold 12 (conveyance step). The composite material 1 set in the mold 12 is pressurized in the mold 12 heated at a predetermined temperature (T4) (pressing step). In this step, since the temperature of the mold 12 is lower than the temperature of the composite material 1 heated by the heating device 11, the temperature of the composite material 1 falls to the predetermined temperature (T4). Subsequently, until the pressing step is completed, the temperature of the composite material 1 is maintained at a predetermined temperature. Note that, in FIG. 5, the temperature of the composite material 1 in the taking-out step is omitted.

Further, as indicated by the solid line P, the pressure working on the composite material 1 is constant at a low value in the heating step and the conveyance step. The pressure working on the composite material 1 in the pressing step increases. In the pressing step, the composite material 1 is pressed at a constant pressure. Thus, the pressure working on the composite material 1 is constant at a high value. After the composite material 1 is taken out of the mold 12 in the taking-out step, the pressure working on the composite material 1 decreases.

Figure 6:
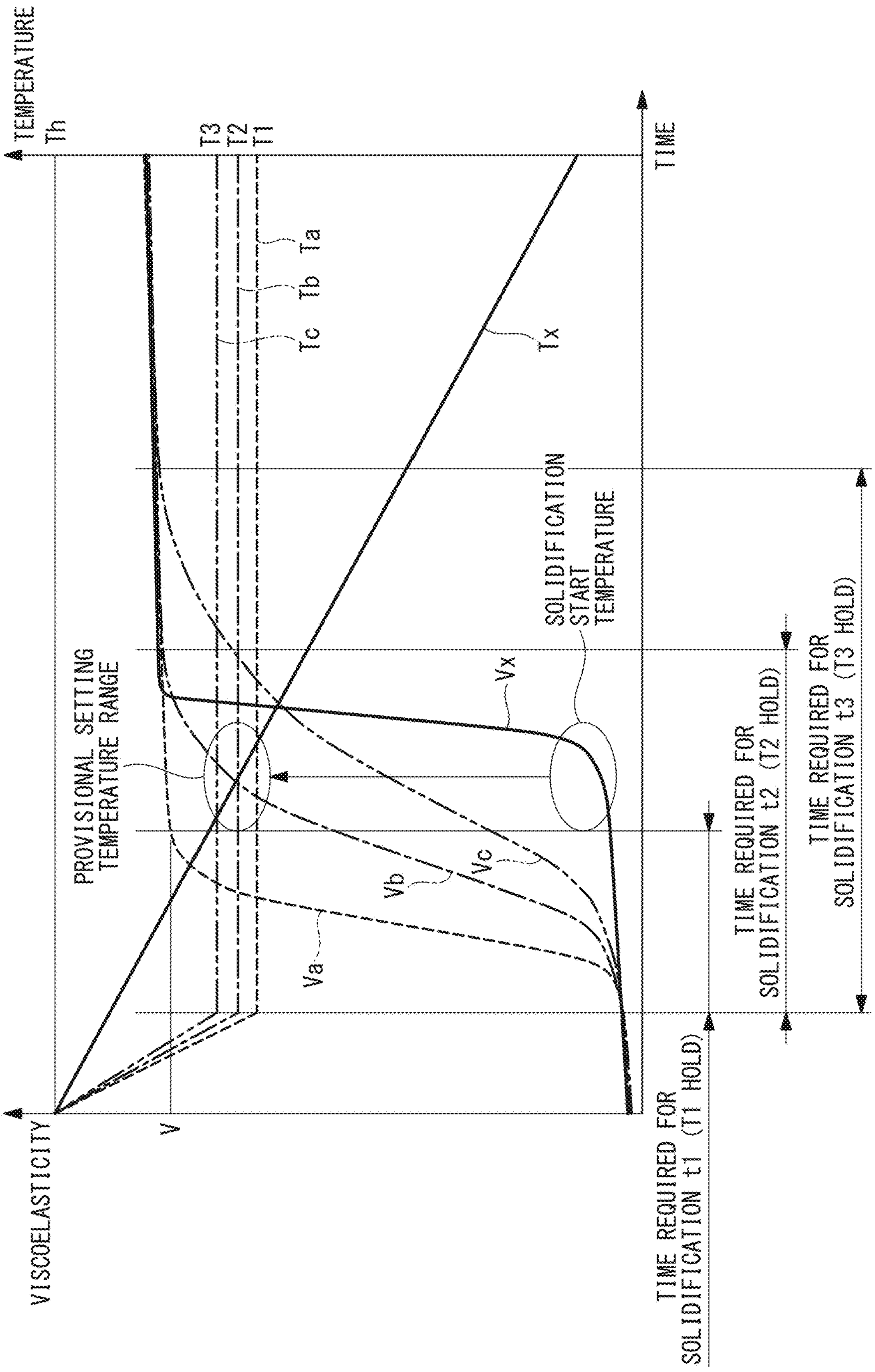
FIG. 6 is a graph illustrating the viscoelasticity and the temperature with time of a resin contained in the composite material according to the embodiment of the present disclosure.

Next, a method of determining the temperature of the mold 12 based on the viscoelasticity of the resin will be described with reference to FIG. 6. In FIG. 6, the horizontal axis represents time, and the vertical axis represents the viscoelasticity of the resin or the temperature of the resin.

Further, the solid line Tx represents a case where the temperature of the resin is gradually reduced, and the solid line Vx represents a change in the viscoelasticity of the resin when the temperature of the resin is gradually reduced as indicated by Tx. Further, the dashed line Ta represents a case where the temperature of the resin is cooled rapidly from the temperature Th to the temperature T1 and then maintained at the temperature T1. Note that the temperature Th is a temperature higher than or equal to the melting point of the base resin. Further, the dashed line Va represents a change in the viscoelasticity of the resin when the temperature of the resin is changed or maintained as represented by the dashed line Ta. Further, the one-dot chain line Tb represents a case where the temperature of the resin is cooled rapidly from the temperature Th to the temperature T2 and then maintained at the temperature T2. The one-dot chain line Vb represents a change in the viscoelasticity of the resin when the temperature of the resin is changed or maintained as represented by the one-dot chain line Tb. Further, the two-dot chain line Tc represents a case where the temperature of the resin is cooled rapidly from the temperature Th to the temperature T3 and then maintained at the temperature T3. The two-dot chain line Vc represents a change in the viscoelasticity of the resin when the temperature of the resin is changed or maintained as represented by the two-dot chain line Tc.

In the present embodiment, when the viscoelasticity becomes higher than or equal to a predetermined value (V), it is determined that the composite material is solidified to have hardness sufficient for taking out the molded product 2 in the taking-out step and thus is determined that the resin is solidified. As illustrated in FIG. 6, the time required for the viscoelasticity of the resin to reach the value V (that is, the time required for the resin to be solidified) differs depending on the temperature of the resin.

As indicated by the dashed line Ta and the dashed line Va, when the temperature T1 of the resin is maintained, the time required for the resin to be solidified (hereafter, referred to as "time required for solidification") is t1. Further, similarly, as indicated by the one-dot chain line Tb and the one-dot chain line Vb, when the temperature of the resin is maintained at T2 (temperature higher than T1), the time required for solidification is t2 that is longer than t1. Further, similarly, as indicated by the two-dot chain line Tc and the two-dot chain line Vc, when the temperature of the resin is maintained at T3 (temperature higher than T2), the time required for solidification is t3 that is longer than t2. Thus, it can be seen that the time required for solidification is longer for a higher temperature of the resin and is shorter for a lower temperature of the resin.

As discussed above, it can be seen that the time required for solidification varies depending on the temperature of the resin. This relationship is used to calculate the temperature of the mold 12 so that a preferable time required for solidification is found.

Specifically, first, a temperature at which solidification of the resin starts (solidification start temperature) is roughly estimated by the solid line Tx and the solid line Vx. Next, a provisional setting temperature range is determined based on the estimated solidification start temperature. Next, the graph of FIG. 6 and the like are used to look up the time required for solidification at the provisional setting temperature of the resin. Accordingly, the temperature corresponding to the time required for solidification that may realize a targeted molding cycle time is selected. The selected temperature is determined as the temperature of the mold 12.

Specifically, for example, when the time required for solidification that may realize a targeted molding cycle time is t3, the temperature T3 that is a temperature corresponding to t3 is selected. The temperature T3 is then determined as the temperature of the mold 12.

Next, the relationship between the temperature of the mold 12 and the evaluation of the molded product 2 will be described with reference to FIG. 7.

FIG. 7 illustrates a relationship between the temperature of the mold 12 (mold setting temperature) for the composite material 1 using a PEEK-based resin whose melting point Tm is 305° C. and quality evaluation of the processed molded product 2. Note that the quality evaluation is classified into “Good”, “Acceptable”, and “Not good” in descending order.

As illustrated in FIG. 7, when the mold setting temperature was 220° C., 240° C., and 260° C., voids occurred inside the molded product 2. Further, impregnation of the resin into fibers was insufficient, and the fibers were thus exposed on the surface of the molded product 2. Therefore, the quality evaluation was classified to “Not good”.

When the mold setting temperature was 265° C., almost no void occurrence was found, and there was no defect in the most part of inside. Further, the most part on the surface of the molded product 2 was in a good condition. Therefore, the quality evaluation was classified to “Acceptable”.

When the mold setting temperature was 270° C., 275° C., and 280° C., no void occurred inside the molded product 2. Further, impregnation of the resin into fibers was sufficient, and the fibers were thus not exposed on the surface of the molded product 2. Therefore, the quality evaluation was classified to “Good”.

When the mold setting temperature was 285° C., no void occurred inside the molded product 2. Further, the most part on the surface of the molded product 2 was in a good condition. Therefore, the quality evaluation was classified to “Acceptable”.

When the mold setting temperature was 290° C., although no void occurred inside the molded product 2, solidification was insufficient on the surface of the molded product 2. Therefore, the quality evaluation was classified to “Not good”.

As discussed above, it is preferable that the temperature of the mold 12 be in a range of Tm-40° C. (265° C.) or higher to Tm-20° C. (285° C.) or lower. It is more preferable that the temperature of the mold 12 be in a range of Tm-35° C. (270° C.) or higher to Tm-20° C. (285° C.) or lower. It is more preferable that the temperature of the mold 12 be in a range of Tm-35° C. (270° C.) or higher to Tm-25° C. (280° C.) or lower.

Note that, according to the result of viscoelasticity measurement, the time required for solidification was about 5 minutes when the temperature of the mold 12 was 270° C. and about 15 minutes when the temperature of the mold 12 was 280° C.

According to the present embodiment, the following effects and advantages are achieved.

In the present embodiment, in the pressing step, the composite material 1 is cooled while the temperature of the mold 12 is maintained constant. Thus, when the composite material 1 is cooled, the temperature of the mold 12 is not positively reduced. Accordingly, variation in the temperature of the mold 12 due to the arrangement of a cooling device (for example, a cooling circuit) that cools the mold 12 or the like is less likely to occur in the cooling process of the composite material 1. This can facilitate uniform cooling of the composite material 1. It is therefore possible to avoid a situation that, due to earlier solidification of a part of the composite material 1, pressing force working on another part (unsolidified part) decreases. Thus, since the pressing force working on the composite material 1 can be uniformed, the composite material 1 can be suitably pressed. Thus, the quality of the processed composite material 1 (molded product 2) can be improved.

Further, in general, when a polymer material such as a thermoplastic resin is maintained at a constant temperature lower than the solidifying point, solidification proceeds over several seconds to several tens of minutes. The time required for solidification is determined based on the temperature of a resin. In this regard, polymer materials such as a thermoplastic resin differ from water/ice or the like that are solidified substantially at a moment just below the solidifying point as the boundary.

In the present embodiment, while the mold 12 presses the composite material 1, the temperature adjustment unit maintains the temperature of the mold 12 at a predetermined temperature at which the time taken for the resin contained in the composite material 1 to be solidified matches a desired time. This makes it possible to adjust the time required for solidification of the resin contained in the composite material 1 to a desired time.

When the composite material 1 is heated by the heating device 11 and the resin is melted, a state where the resin is impregnated into the fibers may transition to a state where the resin is insufficiently impregnated into the fibers. Even in such a case, in the present embodiment, since it is possible to adjust the time required for solidification of the resin contained in the composite material 1 to a desired time, it is possible to obtain the time required for solidification including an estimated time required for the resin to be sufficiently re-impregnated into the fibers, for example. Thus, it is possible to set the time required for solidification so that solidification of the resin is completed after the resin is sufficiently re-impregnated into the fibers. By setting the time required for solidification in such a way, it is possible to sufficiently re-impregnate the resin into the fibers in the mold 12. Therefore, occurrence of a void or the like can be reduced, and the quality of the processed molded product 2 can be improved.

It may be conceivable to reduce the time required for solidification as short as possible in order to shorten the processing time, for example, as with the comparative example illustrated by the dashed line in FIG. 5. Specifically, it may be conceivable to set the temperature of the mold 12 to a temperature at which solidification of the resin proceeds rapidly and reliably as indicated by the dashed line T' of FIG. 5 and thereby shorten the pressurization time indicated by the dashed line P', for example. Specifically, it is conceivable to set the pressurization time to several seconds to several tens of seconds. Note that the holding temperature T5 on the dashed line T' is lower than the holding temperature T4 on the solid line T.

In such a case, however, the resin would be rapidly solidified after the composite material 1 is cooled rapidly by the mold 12, and it would not be possible to ensure the time for impregnating (re-impregnating) the resin into the fibers by pressurization during the resin being in a flowable state. If the re-impregnation is insufficient, a void may remain inside the composite material 1 or the fibers may be exposed without the resin being seeped out on the surface of the composite material 1. Thus, the quality of the processed molded product 2 may be reduced. In particular, when processing a large composite material or a complex-shaped composite material that requires much time for overall impregnation of the resin, since it is not possible to ensure a sufficient pressurization time, this may reduce the quality of the processed molded product 2.

In contrast, in the present embodiment, the temperature of the mold 12 in the pressing step is maintained at a constant temperature that is higher than or equal to a temperature lower by 40° C. than the melting point of the resin contained in the composite material 1 and is lower than or equal to a temperature lower by 20° C. than the melting point of the resin. Accordingly, in the pressing step, although the composite material 1 is cooled rapidly to a predetermined temperature by heat transfer to the mold 12, the viscoelasticity of the base resin of the composite material 1 immediately after the cooling is performed is low enough for the resin to be impregnated into the fibers by pressurization, and the resin can thus be impregnated into the fibers by pressurization until the resin is solidified after the time required for solidification has elapsed. This makes it possible to adjust the time required for solidification of the resin to a time required for the resin to be sufficiently re-impregnated into the fibers, as illustrated in FIG. 6 and the like. Accordingly, the resin can be sufficiently re-impregnated into the fibers in the mold 12. It is therefore possible to reduce occurrence of a void or the like and thus improve the quality of the processed molded product 2.

Further, even when a large composite material or a complex-shaped composite material that requires much time for overall impregnation of the resin is processed, since the time required for solidification can be set to a desired time and thus can be adjusted to a time required for the resin to be sufficiently re-impregnated into the fibers. Therefore, even when processing a large composite material or a complex-shaped composite material, it is possible to reduce occurrence of a void or the like and thus improve the quality.

Note that the present disclosure is not limited to each embodiment described above, and modifications are possible as appropriate within the scope not departing from the spirit of the disclosure.

For example, although the case where the molded product 2 whose cross-sectional shape taken along a plane orthogonal to the longitudinal direction is a hat shape is manufactured by the processing apparatus 10 has been described in the above embodiment, the present disclosure is not limited thereto. For example, the processing apparatus and the processing method according to the present disclosure may be used when a molded product whose cross-sectional shape taken along a plane orthogonal to the longitudinal direction is a C-shape, an L-shape, or a Z-shape is manufactured. In such a case, the pressing surface of the mold has a shape corresponding to the shape of the molded product.

Further, the processing apparatus and the processing method according to the present disclosure may be used when a molded product curved or bent in the longitudinal direction is manufactured. Further, the processing apparatus and the processing method according to the present disclosure may be used when a molded product whose plate thickness changes in the longitudinal direction or the shorter direction is manufactured. Further, the processing apparatus and the processing method according to the present disclosure may be used when a large molded product having an overall length of several meters is manufactured. Further, the processing apparatus and the processing method according to the present disclosure may be used when a molded product having a plate thickness of 5 mm or larger is manufactured. Further, the processing apparatus and the processing method according to the present disclosure may be used when processing is applied to a composite material made of a composite material base material in which all the fiber directions (directions in which fibers extend) are the same. An example of such a composite material may be a continuous fiber unidirectional material (UD material). Further, the processing apparatus and the processing method according to the present disclosure may be used when processing is applied to a composite material in which the fiber directions are different in accordance with composite material base materials (for example, fiber reinforced sheets). An example of such a composite material may be a fabric material (fabric sheet) or a random material (discontinuous fiber random sheet).

Further, for example, although the example in which the composite material 1 is molded into a shape in accordance with the molded product 2 by the mold 12 has been described in the above embodiment, the present disclosure is not limited thereto. For example, the composite material 1 may be molded into a shape in accordance with the molded product 2 before heated by the heating device 11. In such a case, the method of molding the composite material 1 is not particularly limited. For example, the composite material 1 may be molded by pressing the roller or the like against a plate-like composite material 1 or may be molded by using a mold for molding that is separate from the mold 12.

The processing apparatus for a composite material and the processing method for a composite material according to the embodiment described above are understood as follows, for example.

The processing apparatus for a composite material according to one aspect of the present disclosure is a processing apparatus (10) for a composite material (1) in which fibers and a thermoplastic resin are compounded and includes: a heating device (11) configured to heat the composite material to a temperature higher than or equal to the melting point of the resin contained in the composite material; a mold (12) configured to press the composite material; and a temperature adjustment unit configured to adjust the temperature of the mold, and while the mold presses the composite material, the temperature adjustment unit maintains the temperature of the mold at a predetermined temperature at which a time required for solidification of the resin contained in the composite material matches a desired time.

In general, when a polymer material such as a thermoplastic resin is maintained at a constant temperature lower than the solidifying point, solidification proceeds over several seconds to several tens of minutes. Thus, a predetermined time is required until solidification is completed. In such a case, the time required for solidification is determined based on the temperature of the resin. Specifically, the time required for solidification is longer when the temperature of the resin is higher, and the time required for solidification is shorter when the temperature of the resin is lower. In this regard, polymer materials such as a thermoplastic resin differ from water/ice or the like that are solidified substantially at a moment just below the solidifying point as the boundary.

In the above configuration, while the mold presses the composite material, the temperature adjustment unit maintains the temperature of the mold at a predetermined temperature at which the time required for solidification of the resin contained in the composite material matches a desired time. This makes it possible to adjust the time required for solidification of the resin contained in the composite material to a desired time.

When the composite material is heated by the heating device and the resin is melted, a state where the resin is impregnated into the fibers may transition to a state where the resin is insufficiently impregnated into the fibers. Even in such a case, in the above configuration, since it is possible to adjust the time required for solidification of the resin contained in the composite material to a desired time, it is possible to obtain the time required for solidification including an estimated time required for the resin to be sufficiently re-impregnated into the fibers, for example. Thus, it is possible to set the time required for solidification so that solidification of the resin is completed after the resin is sufficiently re-impregnated into the fibers. By setting the time required for solidification in such a way, it is possible to sufficiently re-impregnate the resin into the fibers in the mold. Therefore, occurrence of a void or the like can be reduced, and the quality of the processed molded product can be improved.

Note that the desired time may be, for example, a time required for the resin to be sufficiently re-impregnated into fibers not sufficiently impregnated with the resin because the composite material is heated by the heating device. The state where the resin is sufficiently impregnated into the fibers may be a state where no void or the like occurs when the composite material is solidified.

Further, the predetermined temperature may be, for example, a temperature that is lower than the melting point of the resin and is higher than a temperature at which the resin is rapidly solidified.

Further, in the processing apparatus for a composite material according to one aspect of the present disclosure, the predetermined temperature is determined based on the viscoelasticity of the resin.

The time required for solidification of the resin is determined by the viscoelasticity of the resin and the temperature of the resin. In the above configuration, since the temperature is determined based on the viscoelasticity, the time required for solidification of the resin contained in the composite material can be suitably adjusted to a desired time.

Further, in the processing apparatus for a composite material according to one aspect of the present disclosure, the predetermined temperature is higher than or equal to a temperature lower by 40° C. than a melting point of the resin contained in the composite material and is lower than or equal to a temperature lower by 20° C. than the melting point of the resin.

In the above configuration, the predetermined temperature is higher than or equal to a temperature lower by 40° C. than the melting point of the resin contained in the composite material and is lower than or equal to a temperature lower by 20° C. than the melting point of the resin. This makes it possible to adjust the time required for solidification of the resin to a time required for the resin to be sufficiently re-impregnated into the fibers. Accordingly, the resin can be sufficiently re-impregnated into the fibers in the mold. It is therefore possible to reduce occurrence of a void or the like and thus improve the quality of the processed molded product.

Further, the processing method for a composite material according to one aspect of the present disclosure is a processing method for a composite material (1) in which fibers and a thermoplastic resin are compounded and includes: a heating step of heating the composite material to a temperature higher than or equal to the melting point of the resin contained in the composite material; and a pressing step of pressing, by using a mold (12), the composite material heated by the heating step, and while the mold presses the composite material, the pressing step maintains the temperature of the mold at a predetermined temperature at which a time required for solidification of the resin contained in the composite material matches a desired time by using a temperature adjustment unit configured to adjust the temperature of the mold.

Further, in the processing method for a composite material according to one aspect of the present disclosure, the predetermined temperature is determined based on viscoelasticity of the resin.

Further, in the processing method for a composite material according to one aspect of the present disclosure, the predetermined temperature is higher than or equal to a temperature lower by 40° C. than a melting point of the resin contained in the composite material and is lower than or equal to a temperature lower by 20° C. than the melting point of the resin.

LIST OF REFERENCES

1: composite material
2: molded product
10: processing apparatus
11: heating device
12: mold
13: pressing device
14: first mold
14*a*: pressing surface
15: second mold
15*a*: pressing surface

What is claimed is:

1. A processing method for a composite material in which fibers and a thermoplastic resin are compounded, the processing method comprising:
 heating the composite material to a temperature higher than or equal to a melting point of the resin contained in the composite material; and
 pressing, by using a mold, the composite material heated by the heating at a constant pressure,
 wherein the pressing starts after a temperature of the mold reaches a predetermined temperature at which a predetermined time required for solidification of the resin contained in the composite material matches a desire time,
 wherein, the pressing, in which the composite material is pressed at a constant pressure, includes:
  a step in which the composite material, which has been heated to a temperature equal to or higher than the melting point of the resin, is cooled to the predetermined temperature by heat transfer from the composite material to the mold without decreasing the temperature of the mold, while the mold presses the composite material at the constant pressure and the temperature of the mold is maintained constant at the predetermined temperature by using a temperature adjustment unit configured to adjust the temperature of the mold; and
  a step in which, after the composite material has been cooled to the predetermined temperature, the temperature adjustment unit maintains the mold at a constant predetermined temperature while the mold is pressing the composite material with a constant pressure,
 wherein due to the heating of the composite material that causes the resin to be melted, the fibers are insufficiently impregnated with the resin, and due to the pressing of the composite material, the fibers are impregnated with the resin before solidifying,
 the desired time being a time required for the fibers insufficiently impregnated with the resin to be sufficiently re-impregnated with the resin,
 wherein the fibers sufficiently impregnated with the resin generate no void in the composite material when solidified, whereas the fibers insufficiently impregnated with the resin generate a void in the composite material when solidified, and wherein the predetermined temperature is determined based on viscoelasticity of the resin.

2. The processing method for a composite material according to claim 1, wherein the predetermined temperature is higher than or equal to a temperature lower by 40° C. than a melting point of the resin contained in the composite material and is lower than or equal to a temperature lower by 20° C. than the melting point of the resin.

* * * * *